G. P. CHAPMAN.
FOLDING CAMP BED AND TENT.
APPLICATION FILED AUG. 19, 1916.

1,241,342.

Patented Sept. 25, 1917.

WITNESSES:
Lulu May Strucker
Lula Sullivan

Inventor:
George P. Chapman.
By Claude C. Coffin.
Atty.

UNITED STATES PATENT OFFICE.

GEORGE P. CHAPMAN, OF FORT COLLINS, COLORADO.

FOLDING CAMP BED AND TENT.

1,241,342.                    Specification of Letters Patent.    Patented Sept. 25, 1917.

Application filed August 19, 1916. Serial No. 115,902.

*To all whom it may concern:*

Be it known that I, GEORGE P. CHAPMAN, a citizen of the United States, residing at Fort Collins, in the county of Larimer and State of Colorado, have invented a new and useful Folding Camp Bed and Tent, of which the following is a specification.

My invention relates to improvements in beds and tents suitable to be carried on automobile trailers on camping trips and cross-country tours, and the objects of my improvement are to provide a simple, roomy, combination folding tent and beds of substantial build yet relatively light in weight, capable of being very quickly set up or folded and wherein the opening of the beds automatically unfolds and lifts the tent over the beds and the closing of the beds automatically lowers the tent and folds it within the closed beds. An important object of the improvement is also to provide roomy tent and beds that will fold and close in a neat and compact form for convenient transportation.

I attain these objects by the mechanism and combination of parts illustrated in the accompanying drawing which forms a part of this specification.

In the drawing Figure 1 shows a perspective rear view of the tent and beds set up and as applied to an automobile trailer. Parts of the tent flaps are cut away exposing parts of the tent, beds and trailer.

In the several figures the same reference numerals refer to the same or like parts.

Figure 3:
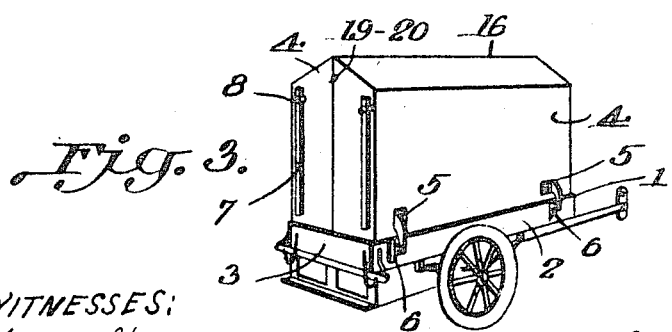
Fig. 3 is a reduced perspective view of the automobile trailer with the tent and beds folded and closed ready for transportation.

1 indicates the body of a two-wheel automobile trailer truck, with side boards 2 and back end gate 3 (see Fig. 3). It will be understood that the invention may be applied to other forms or makes of trucks or vehicles, but is adapted especially to automobile trailers with which such a camping outfit is in greatest demand.

4 is the body or framework of the beds extending lengthwise the trailer and hinged by arms 5 on the bottoms of the bed frames to plates 6 anchored to the side boards 2. Plates 6 may have hooks to rest over the edge of side boards 2, as indicated, and also be bolted or riveted to the side boards. Plates 6 may be provided with a series of holes for the pivot pin hinging the arms 5 to allow for adjustment of the contrivance to fit different widths and sizes of vehicle.

7 indicates supports or legs adjustably pivoted near the outer corners of the bed frames to enable the set-up to be made rigid and substantial. The legs are held in any suitable manner as by pivoted hand clamps 8.

9 are cushions of the beds consisting of mattresses and suitable bedding made up ready for occupancy. Any suitable and well known means may be used to hold this bedding in place when the bed frames are closed together, as hereinafter explained.

10 is the tent of suitable canvas or khaki or other material, fastened permanently by suitable facing along the upper edge of the bed backs, and supported in the middle by folding frame work consisting of ridge pole 11 and hinged tent poles 12. Tent poles 12 are hinged to the ridge pole at their upper ends and at their lower ends to the upper inside edges of the ends of bed frames 4. Suitable pivot pins 13 are provided to hold the tent poles slightly away from the inside of the frame to allow the tent poles to fold inside the frames. Ridge pole 11 is slightly shorter than the length of the beds for the same reason.

14 are tent flaps to drop over the gable ends of the tent and extend down far enough to cover the openings between the opened beds and button to the ends of the bed frames and the body of the trailer.

15 are guy ropes anchored to the corners of the tent to be staked to the ground if desired or necessary. These ropes are preferably sewed in the tent along the edges at the junction of the roof 10 and flaps 14. 16 indicates the facing along the outer edges of the tent which fasten the tent to the bed frames and also act as a cushion to prevent dust or water from getting into the closed beds (see Fig. 3).

17 are suitable windows in the tent flaps at the ends of the beds, and are provided with adjustable curtains 18 on the outside.

19—20 is a suitable hook or lock to anchor the beds together when closed.

Figure 1:
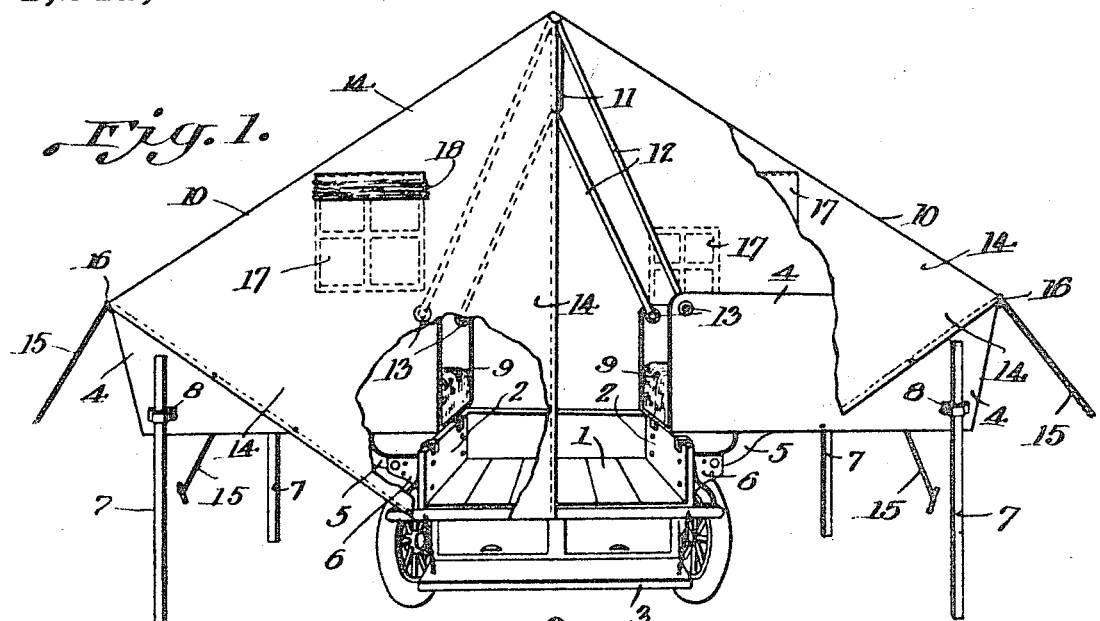
Figure 2:
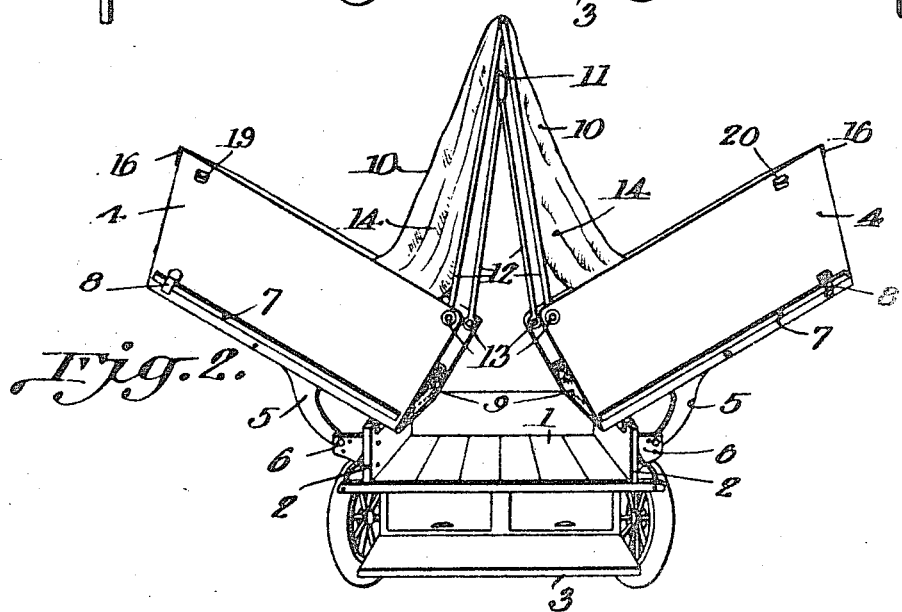
Fig. 2 is a similar view showing the tent and beds partly folded, indicating the manner in which the parts fold and close together.

In operation and use, the camp is set up as shown in Fig. 1. When it is desired to move the camp, tent flaps 14 are unbuttoned at their lower edges from the bed frames and trailer body and tucked back under the tent roof and over the ends of the bed frames; guy ropes 15 are loosened from their stakes and thrown in with the flaps or up on the tent; hand clamps 8 are loosened and legs 7 turned up horizontally and clamped along the edges of the bed frames. Then the outer sides of the beds are merely lifted and they close together forming a closed box and drop into the trailer box. The closing of the beds carries the tent poles 12 downward and the tent automatically folds inside the closed beds as indicated in Figs. 2 and 3. The bed frames are then fastened together by hook or lock 19—20 and the camp is ready to move.

In setting up the operation above described is merely reversed. The opening and swinging of the beds outward and downward about their hinges at the sides of the trailer automatically raises the framework of tent poles and ridge pole bodily and spreads the tent over the beds. Legs 7 are adjusted into place, the tent flaps pulled out and guy ropes staked to the ground, and the camp is ready for occupancy.

As is quite common in camp trailers, the end gate 3 is shown adapted to be lowered and hang from the trailer body by chains to form a step.

By hinging the bed frames by arms fastened on the base of the frames and pivoted to plates at the outside of the trailer, the opened beds are set wide part and above the side boards of the trailer, thus giving ample height to the tent and room in the trailer between the beds for cooking and eating. Ample room is afforded along the center of the trailer to place the usual camp utensils before the beds are closed over them. By hinging the tent poles to the upper edges of the inner edge of the bed frame ends the swinging of the beds over their hinges in opening lifts the pole framework bodily upward giving ample height to the tent.

I claim:

1. The combination of two bed frames adapted to close together and open apart, with tent pole framework hinged to said bed frames and adapted to be raised bodily upward by the opening of said bed frames and lowered by the closing of said bed frames.

2. In a camp bed and tent attachment for automobile trailers a pair of bed frames adapted to close together forming a box, hinges on the bottoms of said bed frames to support each frame upon opposite sides of the trailer and allow said frames to close together and open outward in extended position, folding tent pole framework hinged to the inner edges of said bed frames and adapted to be lowered and folded in the box formed by the closed frames and unfolded and lifted bodily upward by the opening of said bed frames.

3. The combination of two beds adapted to close together so that their frames form a closed box and to open apart in extended position, a tent fastened to the sides of said beds and extending over and above said beds when said beds are opened and adapted to fold between said beds when said beds are closed together, tent pole framework hinged to the upper inside edges of the frames of said beds and under said tent so as to be lifted bodily upward by the opening of the beds and lowered bodily between the beds by the closing of the beds, substantially as described.

4. In combination with a camp trailer two bed frames hinged to opposite sides of said trailer and adapted to swing upon their hinges and close together forming a closed box in the trailer and to open in extended position to the sides of the trailer, a tent fastened to the outer edges of said bed frames and adapted to extend across and above said frames and trailer when the frames are opened in extended position, tent pole framework hinged to the inner edges of said bed frames and under said tent so as to be raised bodily upward to lift said tent when the bed frames are opened and to be lowered and folded with said tent between said bed frames when said frames are closed, substantially as described.

GEORGE P. CHAPMAN.

Witnesses:
W. T. LEWARK,
E. W. GILLETTE.